(12) United States Patent
Schultz (10) Patent No.: US 9,045,094 B2
(45) Date of Patent: Jun. 2, 2015

(54) HARNESS RETAINING MEANS AND HARNESS WIRING STRUCTURE

(71) Applicant: TS TECH Co., Ltd., Saitama (JP)

(72) Inventor: Andrew Schultz, Reynoldsburg, OH (US)

(73) Assignee: TS Tech Co., Ltd., Saitama (JP)

(*) Notice: Subject to any disclaimer, the term of this patent is extended or adjusted under 35 U.S.C. 154(b) by 0 days.

(21) Appl. No.: 14/093,958

(22) Filed: Dec. 2, 2013

(65) Prior Publication Data

US 2014/0138152 A1   May 22, 2014

Related U.S. Application Data

(63) Continuation of application No. 13/146,227, filed as application No. PCT/US2009/032517 on Jan. 30, 2009, now abandoned.

(51) Int. Cl.

| F16L 3/233 | (2006.01) |
|---|---|
| B65D 63/00 | (2006.01) |
| B60R 16/02 | (2006.01) |
| H02G 3/00 | (2006.01) |

(52) U.S. Cl.
CPC ........... *B60R 16/0215* (2013.01); *F16L 3/2332* (2013.01); *F16L 3/2334* (2013.01); *H02G 3/00* (2013.01)

(58) Field of Classification Search
CPC .. B60R 16/0215; F16L 3/2332; F16L 3/2334; H02G 3/00; Y10T 24/00; Y10T 24/141; Y10T 24/1498; Y10T 24/44026

USPC ............... 248/68.1, 71, 74.2, 74.3; 24/16 PB, 24/17 AB, 458; 174/70 R, 72 A
See application file for complete search history.

(56) References Cited

U.S. PATENT DOCUMENTS

| 5,112,013 | A | * | 5/1992 | Tolbert et al. | 248/74.3 |
|---|---|---|---|---|---|
| 5,131,613 | A | * | 7/1992 | Kamiya et al. | 248/74.3 |
| 5,971,815 | A |  | 10/1999 | Polgar et al. |  |
| 6,186,451 | B1 | * | 2/2001 | Benoit | 248/74.3 |
| 6,394,695 | B1 | * | 5/2002 | Chausset | 403/397 |
| 6,443,403 | B1 | * | 9/2002 | Page et al. | 248/71 |
| 7,435,904 | B2 | * | 10/2008 | Peterson et al. | 174/72 A |
| 7,762,503 | B2 | * | 7/2010 | Franks | 248/71 |

(Continued)

FOREIGN PATENT DOCUMENTS

| JP | 06-73577 U | 10/1994 |
|---|---|---|
| JP | 2007-325326 A | 12/2007 |

*Primary Examiner* — Tan Le
(74) *Attorney, Agent, or Firm* — Drinker Biddle & Reath LLP (57) ABSTRACT

A harness retaining device is disclosed for retaining a harness and causing the harness together with a connection element for an electric/electronic circuit to be supported with respect to a portion of a frame of a vehicle seat. The harness retaining device includes a support arm having first and second end portions, the first end portion of the support arm being engagingly connectable with the connection element, an anchor-like clip provided on the first end portion of the support arm, and a locking member provided on the second end portion of the support arm for fastening the harness. When the first end portion of the support arm is connected to the connection element and the anchor-like clip is fitted through the portion of the seat frame, the connection element and the harness are supported with respect to the portion of the frame of the vehicle seat through the support arm.

13 Claims, 4 Drawing Sheets

(56) References Cited

U.S. PATENT DOCUMENTS

| | | | |
|---|---|---|---|
| 7,775,484 B2 * | 8/2010 | Gunzburger | 248/74.3 |
| 2007/0007398 A1 | 1/2007 | Franks | |
| 2007/0194181 A1 | 8/2007 | Rosemann et al. | |
| 2008/0164383 A1 | 7/2008 | Gunzburger | |

* cited by examiner

HARNESS RETAINING MEANS AND HARNESS WIRING STRUCTURE

CROSS REFERENCE TO RELATED APPLICATION

This application is a continuation of U.S. application Ser. No. 13/146,227, which was the National Stage of International Application PCT/US2009/032517, filed on Jan. 30, 2009, the entirety of which is incorporated herein by reference.

BACKGROUND

Disclosed herein is a retainer for retaining a harness and causing the harness together with a connection element for an electric/electronic circuit to be supported with respect to a portion of a frame of a seat in a vehicle.

Generally, wiring of a harness of various electric/electronic equipment in a vehicle is performed in such a manner that the harness is wired to be immediately adjacent to and located along a frame of a vehicle seat and a terminal of the harness is connected to a connection element such as a coupler for an electric/electronic circuit.

The connection element is fixed with respect to a surface of a portion of the frame of the vehicle seat such as a pan frame by an anchor-like clip. In order to prevent shift of the wiring of the harness and/or application of tensile stress to the terminal of the harness which may occur due to the weight of a person sitting on the vehicle seat, the harness is fixed, through a harness retaining clip of an anchor-shape, with respect to a surface of a second seat frame portion or a flange surface which is adjacent the surface of the seat frame portion to which the connection element is fixed. The harness retaining clip is provided with a winding band and a fastening ring for fastening the winding band. The winding band is connected at an end thereof to the fastening ring. By causing the winding band to be wound around the harness and then causing a free end portion of the winding band to be inserted through the fastening ring, the harness is retained by the harness retaining clip.

Such harness retaining clips are disclosed in Japanese Utility Model Application Laid-Open No. Hei. 6-73577 and Japanese Patent Application Laid-Open No. 2007-325326.

In order to fix the harness with respect to the surface of the second seat frame portion or the flange surface by the harness retaining clip, a wider space must be provided on the surface of the second seat frame portion or the flange surface. In addition, when plural harnesses are required to be wired to vertically intersect, a lower harness must be wired under an upper harness before fixing of the upper harness is performed. Therefore, the wiring procedure of the harnesses may depend upon positions in which the harness retaining clips are secured. Moreover, the harness and the connection element are fixed by the separate clips, resulting in increase in the number of parts required for wiring the harness.

The most serious problem occurs when there is no optimal position in which the harness retaining clip is secured. In a case where the harness is not clipped to the seat frame portion, when the person sits on the vehicle seat, to thereby cause a cushion of the vehicle seat to be compressed by the weight of the person and/or cause springs for supporting the cushion to be deformed by the weight of the person, the harness may be shifted and/or the tensile stress may be applied to the terminal of the harness which is connected to the connection element.

SUMMARY

It is an object of various embodiments of the present invention to provide a harness retainer, according to which it is unnecessary to previously obtain a special installation space for a harness on a surface of a portion of a frame of a vehicle seat.

It is another object to provide a harness retainer which does not give bad affect to a procedure for wiring a plurality of harnesses to cause the harnesses to vertically intersect.

It is still another object to provide a harness retainer which allows a harness together with a connection element for an electric/electronic circuit to be supported with respect to a portion of a frame of a vehicle seat.

In accordance with one embodiment, there is provided a harness retainer for retaining a harness and causing the harness together with a connection element for an electric/electronic circuit to be supported with respect to a portion of a frame of a vehicle seat, the harness retainer comprising a substantially belt-like support arm having first and second end portions, the first end portion of the support arm being configured to be engagingly connectable with the connection element, an anchor-like clip provided on the first end portion of the support arm, and a lock provided on the second end portion of the support arm for fastening the harness. When the first end portion of the support arm is connected to the connection element and the anchor-like clip is fitted through the portion of the frame of the vehicle seat, the harness fastened by the lock and the connection element are supported with respect to the portion of the frame of the vehicle seat through the support arm.

As discussed above, the harness retainer comprises the substantially belt-like support arm, the anchor-like clip provided on the first end portion of the support arm, and the lock provided on the second end portion of the support arm for fastening the harness. When the first end portion of the support arm is connected to the connection element and the anchor-like clip is fitted through the portion of the seat frame of the vehicle seat, the harness fastened by the lock and the connection element can be supported with respect to the portion of the frame of the vehicle seat through the support arm. Therefore, it is unnecessary to fix the harness itself using any clip and previously obtain a special installation space for the harness on the surface of the frame portion. Moreover, after the harness is fastened by the lock, a different harness can be wired to vertically intersect the harness fastened by the lock. Therefore, even in a case where plural harnesses are wired, the wiring procedure will not be badly affected. In addition, the support arm which is provided with the clip and the harness retainer retaining the harness and is connected to the connection element is fixed to the seat frame portion by the clip, so that it is possible to prevent shift of the wiring of the harness and/or application of tensile stress to a lead terminal of the harness which is connected to the connection element.

The lock may include a fastening ring provided on the second end portion of the support arm, and a winding band attached at an end thereof to the fastening ring, the fastening ring having a band insertion hole through which a free end portion of the winding band is inserted. The winding band is adapted to be wound around the harness and inserted at the free end portion thereof through the band insertion hole of the fastening ring, whereby the harness is removably retained by the lock. In this case, the harness can be easily retained by the lock and can be easily released from the lock. Therefore, it is possible to easily replace the harness with a different harness.

The clip and the lock may be formed integrally with the support arm. The harness and the connection element are supported to the frame portion by causing the clip integrally provided on the support arm to be fitted through the frame portion, so that with a small number of parts, it is possible to cause both the harness and the connection element to be supported with respect to the frame portion and prevent the shift of the wiring of the harness and/or the application of the tensile stress to the lead terminal of the harness.

The connection element may have a pair of elongated hold-down edge portions of substantially L-shapes spaced apart from each other. In connection with this, the first end portion of the support arm may be provided at both sides thereof with elongated engaging-pieces. In this case, the first end portion of the support arm is removably inserted in a space between the pair of elongated hold-down edge portions of the connection element with the elongated engaging-pieces being engaged with inner surfaces of the pair of elongated hold-down edge portions of the connection element. Therefore, when the first end portion of the support arm is removed from the connection element, the connection element can be used for connection to a harness in a position that does not require the supporting of the harness.

The support arm may include a clip supporting member of a substantially C-shape in cross-section provided on the first end portion of the support arm for supporting the clip, the clip supporting member including a second pair of elongated hold-down edge portions of substantially L-shapes in cross-section spaced apart from each other, and an intermediate portion interconnecting the second pair of elongated hold-down edge portions of the clip supporting member and mounted on the first end portion of the support arm. In connection with this, the clip may include a body and second elongated engaging-pieces provided at both sides of the body. The clip is adapted to be detachably supported to the clip supporting member with the body being inserted in a space between the second pair of elongated hold-down edge portions of the clip supporting member and with the second elongated engaging-pieces of the clip being engaged with inner surfaces of the second pair of elongated hold-down edge portions of the clip supporting member. Therefore, when the support arm is removed from the connection element and the clip is removed from the clip supporting member of the support arm, the clip can be used for fixing the connection element with respect to any portion of the seat frame.

According to a further embodiment, there is provided a structure for wiring a harness to cause the harness together with a connection element for an electric/electronic circuit to be supported with respect to a portion of a frame of a vehicle seat, utilizing the harness retainer as discussed above.

In the structure for wiring a harness, it is unnecessary to fix the harness itself using any clip and previously obtain a special installation space for the harness on the surface of the frame portion. Therefore, the wiring structure facilitates simplification of a structure of the seat frame.

Other objects and many of the attendant advantages of the various embodiments will be readily appreciated as the same becomes better understood by reference to the following detailed description when considered in connection with the accompanying drawings.

DETAILED DESCRIPTION

A retainer for retaining harnesses, according to various embodiments of the present invention, will be discussed hereinafter with reference to the accompanying drawings. In each of the illustrated embodiments, a harness retainer is configured to be used for retaining a harness H, for connecting the harness H to a coupler 1 that is a connection element for an electric/electronic circuit, and for causing the harness H and the coupler 1 to be supported with respect to a portion F of a frame of a vehicle seat, such as a pan frame of the vehicle seat. In the drawings, the coupler 1 and/or an anchor-like clip 2 (or 2') of the harness retainer is shown in a state where a side of the coupler and/or the clip, which is to be opposed to the surface of the frame portion F when the coupler and the harness are supported with respect to the frame portion F, faces upward.

In each of the illustrated embodiments, the harness retainer basically includes the clip to be press-fitted through the portion F of the frame of the vehicle seat, a substantially belt-like support arm, and a lock for fastening the harness H.

Referring now to FIGS. 1-4, the harness retainer according to the first embodiment of the present invention will be discussed hereinafter. In the first embodiment, the clip 2, the support arm 3 and the lock 4 are integrally formed of any suitable resin material. The support arm 3 has a first end portion 31 and a second end portion 32. The clip 2 is provided on the first end portion 31 of the support arm 3. The lock 4 is provided on the second end portion 32 of the support arm 3. As will be discussed hereinafter, the first end portion 31 of the support arm 3 is configured to be engagingly connectable with the coupler 1.

Figure 1:
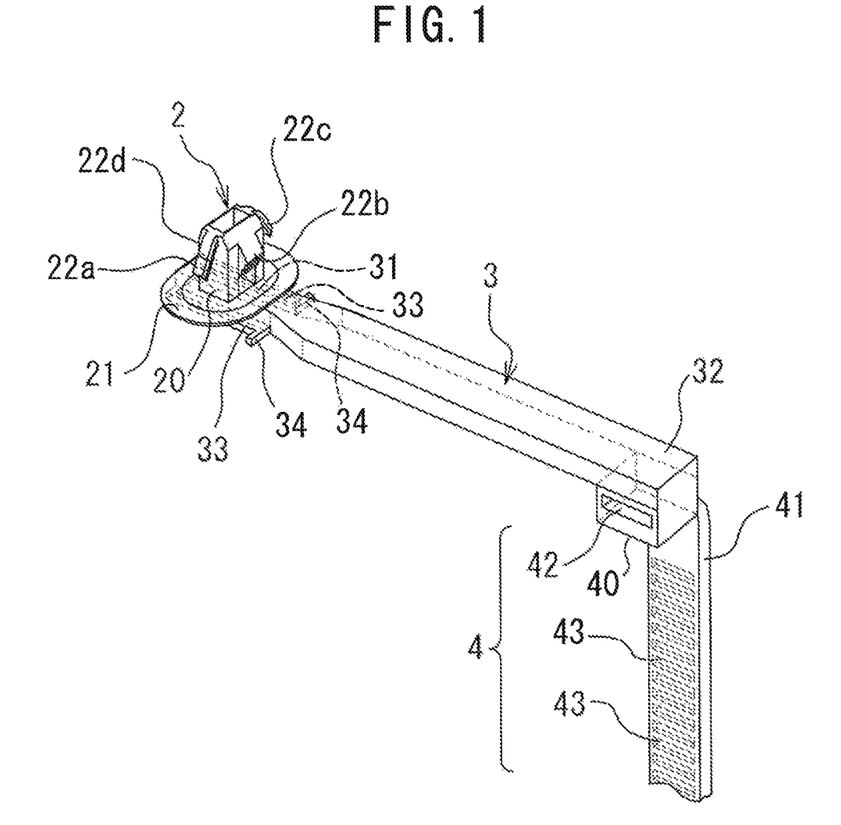
FIG. 1 is a schematic perspective view showing a harness retainer according to a first embodiment.

The clip 2 includes a substantially box-shaped body 20 provided on the first end portion 31 of the support arm 3, a substantially ellipse-shaped flange 21 provided around the substantially box-shaped body 20 to be spaced apart from a surface of the first end portion 31 of the support arm 3, and elastic claws 22a, 22b, 22c, 22d. The elastic claws 22a to 22d are provided at four sides of a free end of the substantially box-shaped body 20 to extend from edges of the four sides of the free end of the substantially box-shaped body 20 toward the flange 21. The clip 2 is adapted to be fixed with respect to the surface of the frame portion F by causing the elastic claws 22a to 22d to be press-fitted through a stopping hole F' formed in the frame portion F (FIG. 4), while causing the elastic claws 22a to 22d to be elastically deformed.

The connection of the first end portion 31 of the support arm 3 to the coupler 1 is performed while causing the flange 21 of the clip 2 to be slid on a pair of elongated hold-down edge portions 12a, 12b of the coupler 1 which will be discussed in greater detail hereinafter.

The lock 4 includes a fastening ring 40 provided on the second end portion 32 of the support arm 3, and a winding band 41 connected at an end thereof to the fastening ring 40.

Figure 3:
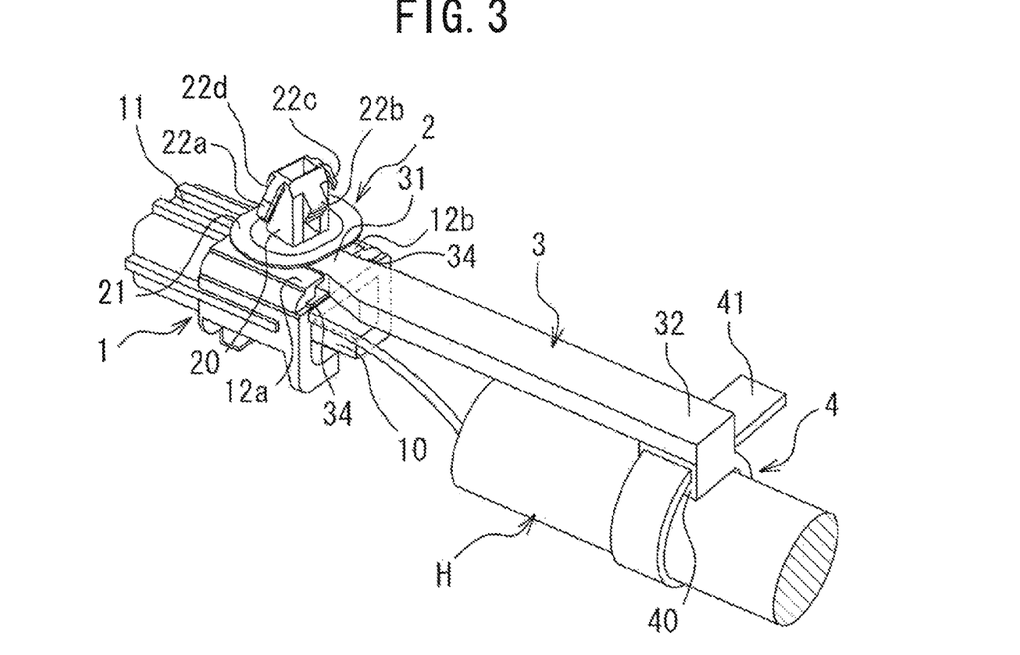
FIG. 3 is a schematic perspective view showing a state where the harness and the coupler are supported by the harness retainer.

The winding band 41 has a plurality of grooves 43 extending in a width direction thereof. The fastening ring 40 has a band insertion hole 42 opening laterally of the support arm 3, and at least one widthwise extending protrusion (not shown) provided in the band insertion hole 42. By causing the winding band 41 to be wound around the harness H, causing a free end portion of the winding band 41 to be inserted through the band insertion hole 42, and then causing any one of the grooves 43 to be engaged with the at least one protrusion of the fastening ring 40, the harness H is fastened by the lock 4 as shown in FIG. 3.

Figure 2:
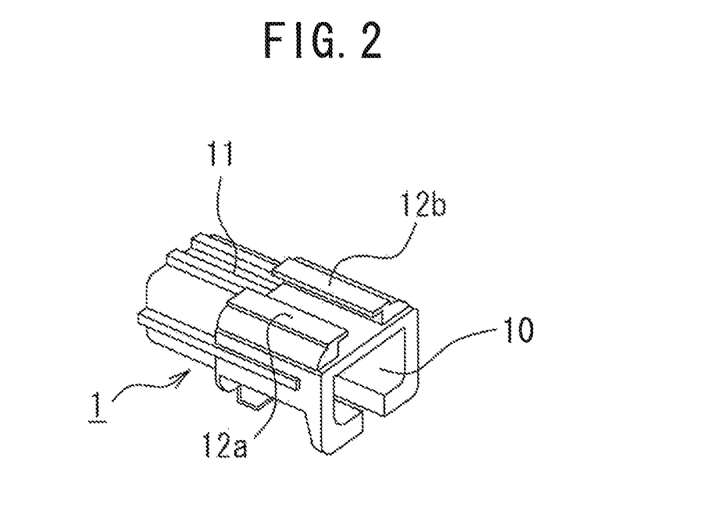
FIG. 2 is a schematic perspective view showing a coupler which is to be connected through the harness retainer to a harness.

As shown in FIG. 2, the coupler 1 includes a housing 11 which has a first receiving hole 10 in which a lead terminal of the harness H is to be inserted in order to be electrically connected to an internal terminal of the coupler 1, and a second receiving hole (not shown) opposite the first receiving hole 10, in which a lead terminal of a second harness (not shown) is inserted in order to be electrically connected to the internal terminal of the coupler 1. The housing 11 of the coupler 1 is formed of an electrically insulating resin material.

As briefly discussed above, the coupler 1 includes the pair of elongated hold-down edge portions 12a, 12b. The elongated hold-down edge portions 12a, 12b are formed on a bottom surface of the housing 11 to be spaced apart from each other and opposed to each other. Each of the elongated hold-down edge portions 12a, 12b is formed into a substantially L-shape in cross-section. As shown in FIG. 1, the first end portion 31 of the support arm 3 is narrower than the second end portion 32 of the support arm 3 and has elongated engaging-pieces 33 provided at both sides of the first narrow end portion 31. The elongated engaging-pieces 33 are provided with stopper protrusions 34 projecting laterally from ends of the elongated engaging-pieces 33.

The harness retainer of the first embodiment which is constructed as discussed above is connected to the coupler 1 by causing the first end portion 31 of the support arm 3 to be inserted into a space between the elongated edge portions 12a, 12b of the coupler 1 while causing the elongated engaging-pieces 33 to be operatively engaged with inner surfaces of the elongated hold-down edge portions 12a, 12b of the coupler 1 and causing the substantially ellipse-shaped flange 21 of the clip 2 to be slid on the elongated hold-down edge portions 12a, 12b. The insertion of the first end portion 31 of the support arm 3 into the space between the elongated hold-down edge portions 12a, 12b of the coupler 1 is performed until the stopper protrusions 34 of the elongated engaging-pieces 33 are operatively abutted against an end surface of the housing 11 of the coupler 1 as shown in FIG. 3.

Figure 4:
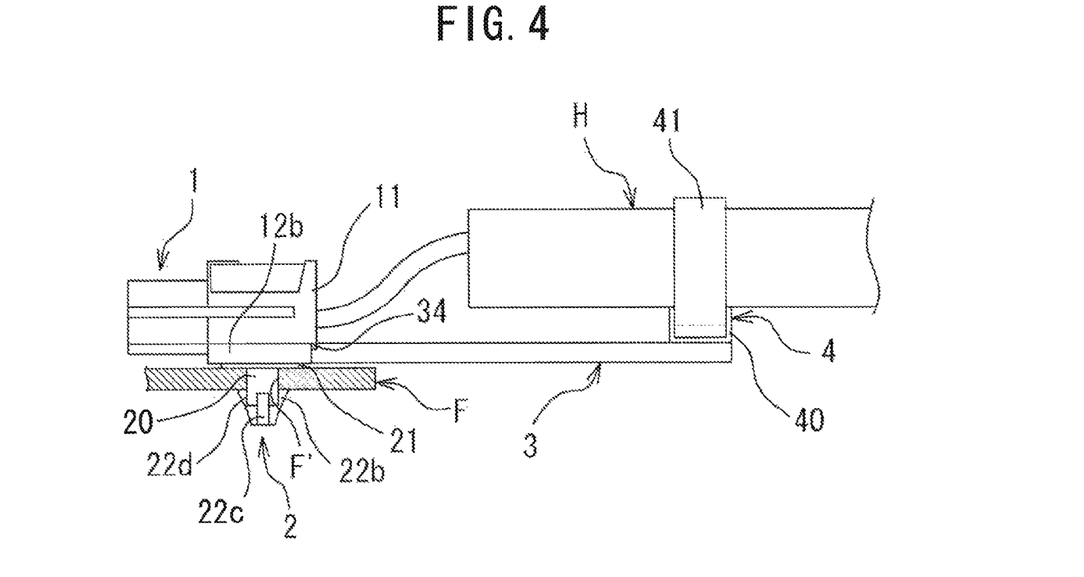
FIG. 4 is a schematic side view showing a state where a combination comprising the harness, the harness retainer, and the coupler is fixed with respect to a surface of a portion of a frame of a vehicle seat.

As shown in FIG. 4, the coupler 1 connected to the harness retainer is fixed with respect to the surface of the frame portion F by causing the clip 2 to be press-fitted through the stopping hole F' of the frame portion F. After the coupler 1 is fixed with respect to the surface of the frame portion F by the clip 2, the harness H can be retained with respect to the lock 4 by causing the winding band 41 to be wound around the harness H, causing the free end portion of the winding band 41 to be inserted through the band insertion hole 42 of the fastening ring 40, and then causing any one of the grooves 43 of the winding band 40 to be engaged with the at least one protrusion of the fastening ring 41. The lead terminal of the harness H is inserted in the first receiving hole 10 of the coupler 1.

In the case where the clip 2 is press-fitted through the stopping hole F' of the frame portion F as discussed above, the harness H fastened by the lock 4 is supported with respect to the frame portion F through the support arm 3 of the harness retainer, so that it is unnecessary to fix the harness H itself using any clip and previously obtain a special installation space for the harness H on the surface of the frame portion F. Therefore, the harness retainer according to the present invention facilitates simplification of the structure of the seat frame.

Moreover, after the harness H is retained by the lock 4 of the harness-retainer according to the first embodiment, a different harness can be wired to vertically intersect the harness H retained by the harness-retainer. Therefore, even if plural harnesses are vertically wired, the wiring procedure will not be badly affected. In addition, the support arm 3 which is provided with the clip 2 and the harness retainer 4 retaining the harness H and is connected to the coupler 1 is fixed to the seat frame portion F by the clip 2, so that it is possible to prevent shift of the wiring of the harness and/or application of tensile stress to the lead terminal of the harness which is connected to the coupler 1.

Moreover, the harness H can be easily retained by the lock 4 comprising the fastening ring 40 and the winding band 41 and can be easily released from the lock 4 by causing the winding band 41 to be unwound from the harness H. Therefore, retaining operation of the harness H by the lock 4 and replacing operation of the harness H can be easily performed. As discussed above, the harness H and the coupler 1 are supported to the frame portion F by causing the clip 2 provided on the support arm 3 to be fitted through the stopping hole F' of the frame portion F, so that with a small number of parts, it is possible to cause both the harness H and the coupler 1 to be supported with respect to the frame portion F and prevent the shift of the wiring of the harness and/or the application of the tensile stress to the lead terminal of the harness.

Incidentally, the support arm 3 is configured to be removable from the coupler 1, so that when the support arm 3 is removed from the coupler 1, the coupler 1 can be used for connection to a harness in a position that does not require the supporting of the harness.

Figure 5:
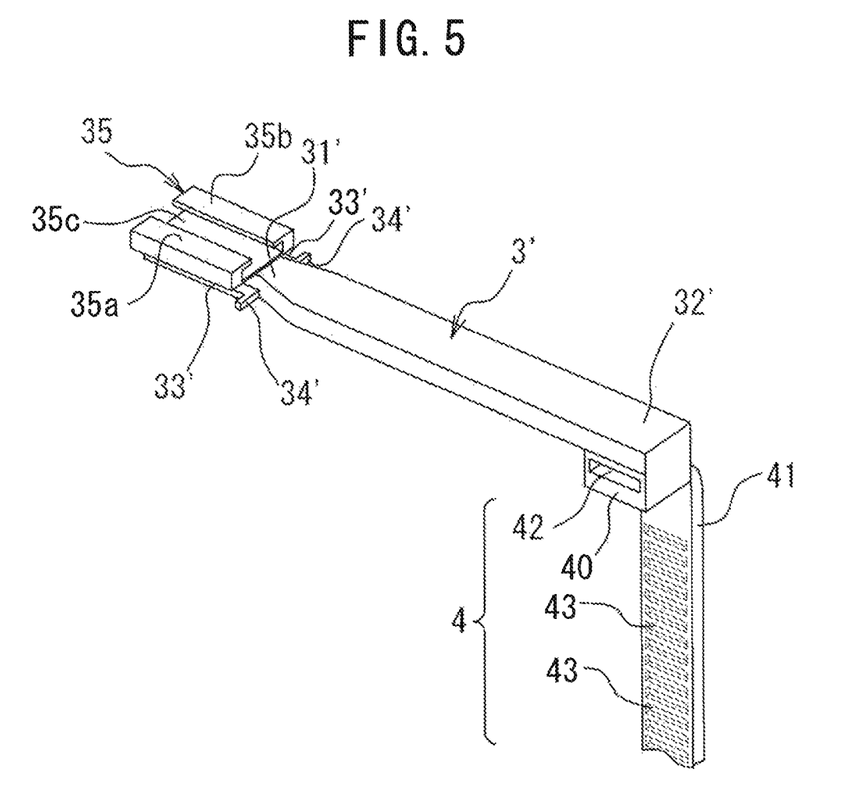
FIG. 5 is a schematic perspective view showing a support arm of a harness retainer according to a second embodiment.
Figure 6:
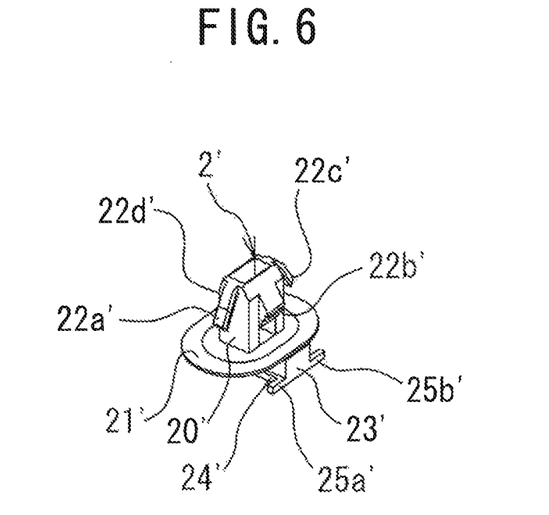
FIG. 6 is a schematic perspective view showing a clip which is to be removably provided on the support arm of FIG. 5.
Figure 7:
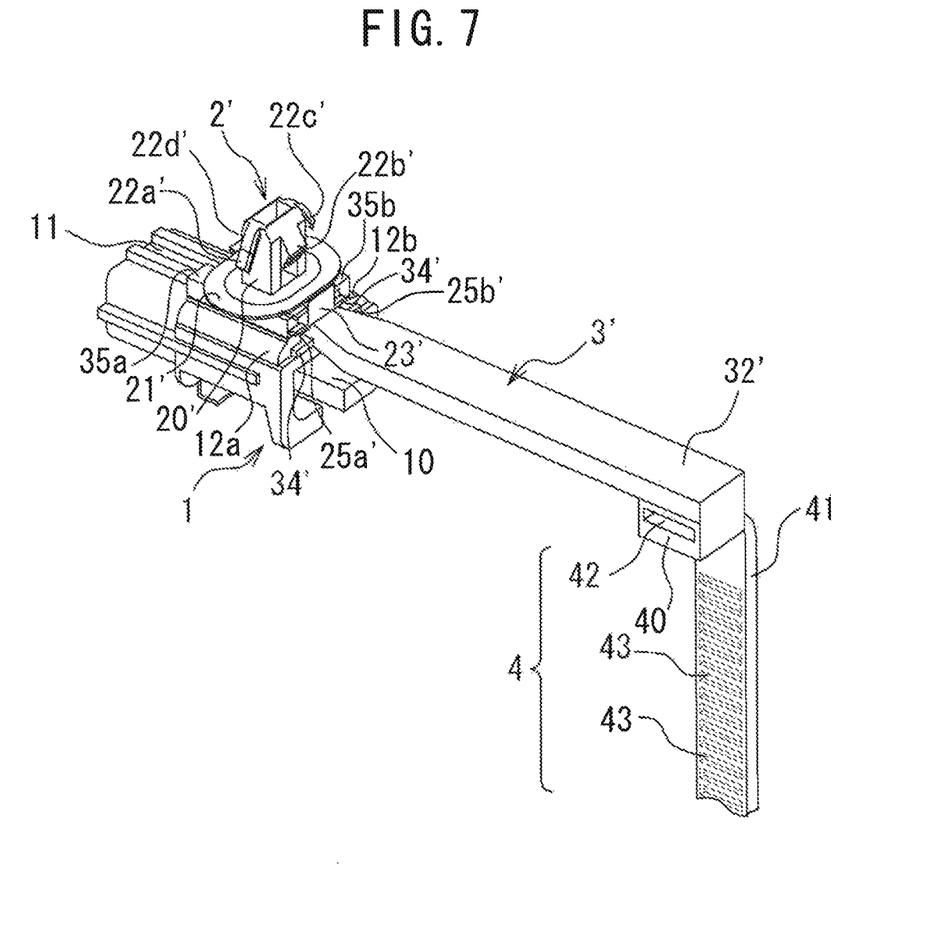
FIG. 7 is a schematic perspective view showing a combination comprising the support arm of FIG. 5, the clip of FIG. 6, and the coupler of FIG. 2.

Referring to FIGS. 5 to 7, the harness retainer according to the second embodiment of the present invention will be discussed hereinafter. The harness retainer according to the second embodiment is substantially similar to that according to the first embodiment except that a different support arm 3' and a different anchor-like clip 2' are employed and the clip 2' is configured to be detachable from the support arm 3'.

As shown in FIG. 5, the support arm 3' is provided on a first end portion 31' thereof with a clip supporting member 35 of a substantially C-shape in cross-section for supporting the clip 2'. More particularly, the clip supporting member 35 includes a pair of elongated hold-down edge portions 35a, 35b of substantially L-shapes in cross-section spaced apart from each other, and an intermediate portion 35c that interconnects the elongated hold-down edge portions 35a, 35b and is mounted on the first end portion 31' of the support arm 3'. Like the first end portion 31 of the support arm 3 of the harness retainer according to the first embodiment, the first end portion 31' of the harness retainer according to the second embodiment is narrower than a second end portion 32' of the support arm 3' and has elongated engaging-pieces 33' provided at both sides of the first narrow end portion 31'. The elongated engaging-pieces 33' are provided with stopper protrusions 34' projecting laterally from ends of the elongated engaging-pieces 33'. Moreover, the lock 4 is provided on the second end portion 32' of the support arm 3'.

The clip 2' is formed independently from the support arm 3'. As shown in FIG. 6, the clip 2' includes a substantially box-shaped body 20', a substantially ellipse-shaped flange 21' provided around the substantially box-shaped body 20', elastic claws 22a', 22b', 22c', 22d', and a base portion 23'. The elastic claws 22a' to 22d' are provided at four sides of a free end of the substantially box-shaped body 20' to extend from edges of the four sides of the free end of the substantially box-shaped body 20' toward the flange 21'. The base portion 23' is projected from the body 20' in a direction opposite to the free end of the body 20'. The base portion 23' is provided at both sides thereof with elongated engaging-pieces 24' (only one elongated engaging-piece 24' is shown in FIG. 6). The elongated engaging-pieces 24' has stopper protrusions 25a', 25b' projecting laterally from ends thereof.

The clip 2' is detachably attached to the clip supporting member 35 of the support arm 3' by causing the base portion 23' of the clip 2' to be inserted into a space between the elongated hold-down edge portions 35a, 35b of the clip supporting member 35 while causing the elongated engaging-pieces 24' to be operatively engaged with inner surfaces of the elongated hold-down edge portions 35a, 35b of the clip supporting member 35 of the support arm 3' and causing the substantially ellipse-shaped flange 21' of the clip 2' to be slid on the elongated hold-down edge portions 35a, 35b of the support arm 3'. The insertion of the base portion 23' of the clip 2' into the space between the elongated hold-down edge portions 35a, 35b of the clip supporting member 35 is performed until the stopper protrusions 25a', 25b' of the clip 2' are abutted against an end surface of the clip supporting member 35 of the support arm 3' as shown in FIG. 7. In the second embodiment, the harness is retained by the lock 4 in the same manner as the harness is retained by the lock 4 of the harness retainer according to the first embodiment.

The first end portion 31' of the support arm 3' of the harness retainer according to the second embodiment is connected to the coupler 1 (FIG. 2) in the substantially same manner as the first end portion 31 of the support arm 3 of the harness retainer according to the first embodiment is connected to the coupler 1. More particularly, the first end portion 31' of the support arm 3' is connected to the coupler 1 by causing the first end portion 31' of the support arm 3' to be inserted into the space between the elongated edge portions 12a, 12b of the coupler 1 while causing the elongated engaging-pieces 33' to be operatively engaged with the inner surfaces of the elongated hold-down edge portions 12a, 12b of the coupler 1 and causing the clip supporting member 35 of the support arm 3' to be slid on the elongated hold-down edge portions 12a, 12b. The insertion of the first end portion 31' of the support arm 3' into the space between the elongated hold-down edge portions 12a, 12b of the coupler 1 is performed until the stopper protrusions 34' of the elongated engaging-pieces 33' are abutted against the end surface of the housing 11 of the coupler 1 as shown in FIG. 7.

The clip 2' having been attached to the clip supporting member 35 as discussed above is then is attached with respect to the surface of the frame portion F (see FIG. 4) by causing the elastic claws 22a' to 22d' to be press-fitted through the stopping hole F' formed in the frame portion F (see FIG. 4), while causing the elastic claws 22a' to 22d' to be elastically deformed. Thus, the coupler 1 and the harness H retained by the lock 4 of the harness retainer according to the second embodiment are supported with respect to the frame portion through the support arm 3' of the harness retainer according to the second embodiment.

The harness retainer according to the second embodiment can exert the same effects as the harness retainer according to the first embodiment can do. In addition, the clip 2' of the harness retainer according to the second embodiment is configured to be detachable from the support arm 3', so that if a harness is not required to be retained, the clip 2' is removed from the support arm 3' and can be used for fixing the connection element with respect to any portion of the seat frame.

It is to be noted that the clips 3, 3' are merely employed as illustrative examples and the configurations of the clips are not limited to those described above. For example, there may be employed a clip that includes a substantially Y-shaped body in lieu of the substantially box-shaped body 20 (20'). In this case, two elastic claws are provided at tip ends of branched portions of the substantially Y-shaped body, in lieu of the four elastic claws. It is to be also noted that the lock is merely employed as an illustrative example and the configuration of the lock is not limited to that described above. For example, the lock may comprise a ring-shaped member through which the harness is fitted.

The terms and expressions which have been employed herein are used as terms of description and not of limitation. There is no intention in the use of such terms and expressions to exclude any equivalents of the features shown and described, or any portion thereof. It is recognized, however, that various modifications are possible within the scope of the invention claimed.

What is claimed is:

1. A harness retainer for retaining a harness and supporting said harness with respect to a portion of a seat frame of a vehicle seat, said harness retainer comprising:
   a support arm having first and second end portions;
   a connection element;
   an anchor-like clip provided on said first end portion of said support arm; and
   a lock provided on said second end portion of said support arm for fastening said harness;
   wherein:
   said first end portion of said support arm comprises an engagingly connectable element to connect with said connection element that comprises an electronic circuit support;
   said anchor-like clip is disposed on an opposite side of said engagingly connectable element relative to said first end portion of said support arm;
   said connection element has a pair of elongated hold-down edge portions of substantially L-shapes spaced apart from each other;
   said first end portion of said support arm is provided at both sides thereof with elongated engaging-pieces;
   said first end portion of said support arm is inserted in a space between said pair of elongated hold-down edge portions of said connection element; and
   said elongated engaging-pieces are engaged with inner surfaces of said pair of elongated hold-down edge portions.

2. A harness retainer according to claim 1, wherein said lock comprises:
   a fastening ring provided on said second end portion of said support arm; and
   a winding band attached at an end thereof to said fastening ring,
   wherein:
   said fastening ring has a band insertion hole through which a free end portion of said winding band is inserted, and
   said winding band is windable around said harness and insertable at the free end portion thereof through said band insertion hole of said fastening ring, whereby said harness is retained by said lock.

3. A harness retainer according to claim 1, wherein said clip and said lock are formed integrally with said support arm.

4. A harness retainer according to claim 1, wherein:
said support arm includes a clip supporting member of a substantially C-shape in cross-section provided on said first end portion thereof for removably supporting said clip;
said clip supporting member includes a second pair of elongated hold-down edge portions of substantially L-shapes in cross-section spaced apart from each other, and an intermediate portion that interconnects said second pair of elongated hold-down edge portions and is mounted on said first end portion of the support arm; said clip includes a body and second elongated engaging-pieces provided at both sides of said body;
said clip is detachably attached to said clip supporting member;
said body is inserted in a space between said second pair of elongated hold-down edge portions of said clip supporting member; and
said second elongated engaging-pieces are engaged with inner surfaces of said second pair of elongated hold-down edge portions.

5. A harness retainer according to claim 2, wherein:
said support arm includes a clip supporting member of a substantially C-shape in cross-section provided on said first end portion thereof for removably supporting said clip;
said clip supporting member includes a second pair of elongated hold-down edge portions of substantially L-shapes in cross-section spaced apart from each other, and an intermediate portion that interconnects said second pair of elongated hold-down edge portions and is mounted on said first end portion of the support arm;
said clip includes a body and second elongated engaging-pieces provided at both sides of said body;
said clip is detachably attached to said clip supporting member;
said body is inserted in a space between said second pair of elongated hold-down edge portions of said clip supporting member; and
said second elongated engaging-pieces are engaged with inner surfaces of said second pair of elongated hold-down edge portions.

6. A harness retainer according to claim 3, wherein:
said support arm includes a clip supporting member of a substantially C-shape in cross-section provided on said first end portion thereof for removably supporting said clip;
said clip supporting member includes a second pair of elongated hold-down edge portions of substantially L-shapes in cross-section spaced apart from each other, and an intermediate portion that interconnects said second pair of elongated hold-down edge portions and is mounted on said first end portion of the support arm; said clip includes a body and second elongated engaging-pieces provided at both sides of said body;
said clip is detachably attached to said clip supporting member;
said body is inserted in a space between said second pair of elongated hold-down edge portions of said clip supporting member; and
said second elongated engaging-pieces are engaged with inner surfaces of said second pair of elongated hold-down edge portions.

7. A structure for wiring a harness to support said harness together with an electric/electronic circuit with respect to a portion of a frame of a vehicle seat, comprising:
said harness retainer according to claim 1.

8. A structure for wiring a harness to support said harness together with an electric/electronic circuit with respect to a portion of a frame of a vehicle seat, comprising:
said harness retainer according to claim 2.

9. A structure for wiring a harness to support said harness together with an electric/electronic circuit with respect to a portion of a frame of a vehicle seat, comprising:
said harness retainer according to claim 3.

10. A structure for wiring a harness to support said harness together with an electric/electronic circuit with respect to a portion of a frame of a vehicle seat, comprising:
said harness retainer according to claim 4.

11. A structure for wiring a harness to support said harness together with an electric/electronic circuit with respect to a portion of a frame of a vehicle seat, comprising:
said harness retainer according to claim 5.

12. A structure for wiring a harness to support said harness with respect to a portion of a seat frame of a vehicle seat, comprising:
said harness;
a harness retainer for retaining said harness and supporting said harness with respect to said portion of said seat frame of said vehicle seat, said harness retainer comprising:
a support arm having first and second end portions;
an anchor-like clip provided on said first end portion of said support arm for being fitted through said portion of said seat frame; and
a lock provided on said second end portion of said support arm for fastening said harness,
wherein:
said first end portion of said support arm comprises an engagingly connectable element to connect with a connection element;
said lock is disposed on an opposite side of said anchor-like clip relative to a body of said support arm;
said harness is fastened by said lock,
said support arm is an elongated member;
said harness extends along a longitudinal direction of said support arm; and
said support arm and said harness are disposed in an overlapped manner with each other in a direction of fitting said anchor-like clip through said seat frame.

13. A structure for wiring a harness to support said harness with respect to a portion of a seat frame of a vehicle seat, comprising:
said harness;
a harness retainer for retaining said harness and supporting said harness with respect to said portion of said seat frame of said vehicle seat, said harness retainer comprising:
a support arm having first and second end portions;
an anchor-like clip provided on said first end portion of said support arm for being fitted through said portion of said seat frame; and
a lock provided on said second end portion of said support arm for fastening said harness,
wherein:
said first end portion of said support arm comprises an engagingly connectable element to connect with a connection element;
said support arm is an elongated member having said first end portion at one end in a longitudinal direction of said elongated member and said second end at an other end in said longitudinal direction of said elongated member;
said harness is fastened by said lock, said harness extends along a longitudinal direction of said support arm; and said support arm and said harness are disposed in an overlapped manner with each other in a direction of fitting said anchor-like clip through said seat frame.

* * * * *